United States Patent
Minas et al.

(10) Patent No.: US 12,017,789 B2
(45) Date of Patent: Jun. 25, 2024

(54) ONBOARD LIQUID HYDROGEN STORAGE FOR A HYDROGEN AIRCRAFT

(71) Applicant: General Electric Company, Schenectady, NY (US)

(72) Inventors: Constantinos Minas, Slingerlands, NY (US); Ernst Wolfgang Stautner, Niskayuna, NY (US); Michael J. Rysz, Loveland, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 15 days.

(21) Appl. No.: 17/449,971

(22) Filed: Oct. 5, 2021

(65) Prior Publication Data
US 2023/0107610 A1  Apr. 6, 2023

(51) Int. Cl.
*B64D 37/30* (2006.01)
*B64D 37/04* (2006.01)
(Continued)

(52) U.S. Cl.
CPC ............ *B64D 37/30* (2013.01); *B64D 37/04* (2013.01); *B64D 37/06* (2013.01); *B64D 37/20* (2013.01)

(58) Field of Classification Search
CPC ........ B64D 37/04; B64D 37/08; B64D 37/10; B64D 37/30; F17C 1/12; F17C 1/06;
(Continued)

(56) References Cited

U.S. PATENT DOCUMENTS

| 2,637,513 | A | * | 5/1953 | Wallen | B64D 37/04 244/135 R |
| 2,940,631 | A | * | 6/1960 | Keeping | F17C 3/08 62/48.1 |

(Continued)

FOREIGN PATENT DOCUMENTS

| CN | 201120842 Y | 9/2008 |
| CN | 110529726 A | 12/2019 |

(Continued)

OTHER PUBLICATIONS

Sloop, John L. "Liquid Hydrogen as a Propulsion Fuel, 1945-1959." The NASA History Series (1978) available at https://babel.hathitrust.org/cgi/pt?id=uiug.30112056592113&view=1up&seq=1 (last visited Dec. 12, 2022) (Year: 1978).*

(Continued)

*Primary Examiner* — Joshua J Michener
*Assistant Examiner* — Ka Chun Leung
(74) *Attorney, Agent, or Firm* — Venable LLP; David D. Leege; Michele V. Frank

(57) ABSTRACT

An aircraft including a fuselage, a power generator configured to provide power to the aircraft, and at least one fuel tank for holding fuel for the power generator, and a fuel delivery assembly. The fuel tank is positioned in the fuselage and is configured to hold hydrogen fuel in a liquid phase. The fuel tank has a chamber for holding the hydrogen fuel and a fuel extraction line fluidly coupled to the chamber. The fuel extraction line extends from the fuel tank in a forward direction of the fuselage and at a downward angle relative to a centerline of the fuselage. The fuel delivery assembly is fluidly coupled to the fuel extraction line and fluidly connects the fuel tank to the power generator. The fuel delivery assembly is configured to provide the hydrogen fuel from the fuel tank to the power generator.

20 Claims, 6 Drawing Sheets

(51) Int. Cl.
*B64D 37/06* (2006.01)
*B64D 37/20* (2006.01)

(58) Field of Classification Search
CPC ........ F17C 3/08; F17C 13/001; F17C 13/006; F17C 2203/0391; F17C 2270/0189
See application file for complete search history.

(56) References Cited

U.S. PATENT DOCUMENTS

| | | | | |
|---|---|---|---|---|
| 3,843,010 | A * | 10/1974 | Morse | F17C 1/06 |
| | | | | 138/30 |
| 4,821,907 | A | 4/1989 | Castles et al. | |
| 6,708,502 | B1 * | 3/2004 | Aceves | F17C 3/08 |
| | | | | 220/560.08 |
| 7,810,669 | B2 | 10/2010 | Westenberger | |
| 8,028,951 | B2 | 10/2011 | MacCready et al. | |
| 8,100,284 | B2 * | 1/2012 | Schlag | F17C 3/08 |
| | | | | 220/560.12 |
| 8,430,237 | B2 | 4/2013 | Westenberger et al. | |
| 10,260,678 | B2 | 4/2019 | Christ | |
| 2005/0230554 | A1 * | 10/2005 | Schoene | B64D 37/04 |
| | | | | 244/135 R |
| 2008/0141684 | A1 * | 6/2008 | Jung | F17C 6/00 |
| | | | | 62/48.1 |
| 2010/0287955 | A1 * | 11/2010 | Watts | F02M 25/12 |
| | | | | 62/50.6 |
| 2015/0210162 | A1 * | 7/2015 | Albert | B60K 15/077 |
| | | | | 220/563 |
| 2017/0341769 | A1 * | 11/2017 | Haberbusch | F17C 5/007 |
| 2019/0190041 | A1 | 6/2019 | Godula-Jopek et al. | |
| 2020/0180774 | A1 * | 6/2020 | Rainville | B64C 39/024 |

FOREIGN PATENT DOCUMENTS

| | | | | |
|---|---|---|---|---|
| FR | 3127269 | A1 | 3/2023 | |
| GB | 2591255 | * | 7/2021 | |
| WO | WO-2020240198 | A1 * | 12/2020 | B60L 50/71 |

OTHER PUBLICATIONS

"Weight and Balance." Federal Avaiation Administration (1995) available at https://www.faasafety.gov/files/gslac/library/documents/2006/Oct/6861/P8740-05.pdf (last visited Dec. 9, 2022) (Year: 1995).*

Birmingham et al. "Vessels for the Storage and Transport of Liquid Hydrogen." Journal of Research of the National Bureau of Standards (1957) (Year: 1957).*

Zheng et al., "The Application of Carbon Fiber Composites in Cryotank," Open access peer-reviewed chapter, Published Mar. 14, 2018, accessed at www.intechopen.com/chapters/58970.

* cited by examiner

ONBOARD LIQUID HYDROGEN STORAGE FOR A HYDROGEN AIRCRAFT

TECHNICAL FIELD

The present disclosure relates to hydrogen storage, in particular, liquid hydrogen storage. In more detail, this disclosure relates to onboard liquid hydrogen storage for a hydrogen aircraft.

BACKGROUND

The propulsion system for commercial aircraft typically includes one or more aircraft engines, such as turbofan jet engines. These engines may be powered by aviation turbine fuel, which is typically a combustible hydrocarbon liquid fuel, such as a kerosene-type fuel, having a desired carbon number and carbon-to-hydrogen ratio. Such fuel produces carbon dioxide upon combustion, and improvements to reduce or to eliminate such carbon dioxide emissions in commercial aircraft are desired.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 11A illustrates a ground (idle) condition and a cruise condition. FIG. 11B illustrates takeoff and climb. FIG. 11C illustrates descent.

DETAILED DESCRIPTION

Figure 2:
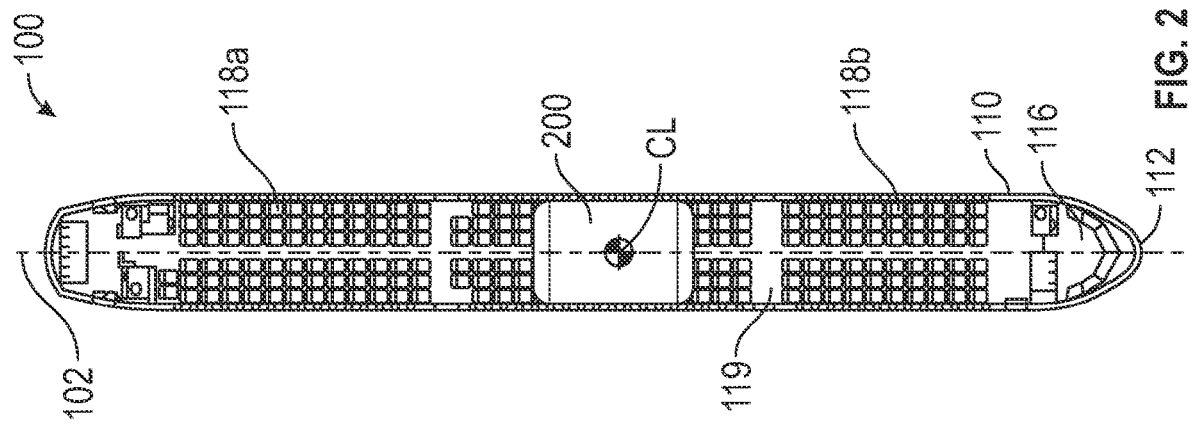
FIG. 2 is a cross section of a fuselage of the aircraft shown in FIG. 1 taken along line 2-2 in FIG. 1.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

Combustible hydrocarbon liquid fuel, such as Jet-A fuel, has long been used in gas turbine engines for aircraft. The fuel storage aboard the aircraft has been designed for such fuels. A hydrogen fuel (diatomic hydrogen) may be utilized to eliminate carbon dioxide emissions from commercial aircraft. Hydrogen fuel, however, poses a number of challenges as compared with combustible hydrocarbon liquid fuel. For example, in its gaseous form, hydrogen fuel has a much lower power density than Jet-A fuel. Even when hydrogen fuel is stored in the liquid phase, the liquid hydrogen fuel requires approximately four times the volume of Jet-A fuel to operate the aircraft over a given range. Moreover, hydrogen fuel has a relatively low boiling point and must be stored at cryogenic temperatures to be maintained in the liquid phase. A storage tank holding liquid hydrogen cryogenically requires more space overall and has an increased weight as compared with a storage tank holding a comparable volume of Jet-A fuel.

These space and weight requirements can be a particular disadvantage when using hydrogen fuel for applications such as aircraft, where space and weight are at a premium. The present disclosure discusses systems and a fuel tank for storing liquid hydrogen (diatomic hydrogen) onboard an aircraft for use as a fuel to power the aircraft or components thereof. In one embodiment, the fuel tank discussed herein is a lightweight tank made from dual wall composite cylinders. Even with such a fuel tank, a certain amount of heat is input to the liquid hydrogen from the ambient air around the fuel tank, resulting in some of the liquid hydrogen boiling, so-called "boil-off" vapors, and the upper portions of the fuel tank include hydrogen in the gaseous phase (gaseous hydrogen). When the liquid hydrogen fuel is extracted from the fuel tank, the fuel is preferably extracted without the hydrogen boil-off vapors. As the fuel tank provides hydrogen fuel, the volume of the liquid hydrogen fuel in the fuel tank decreases and the remaining volume in the fuel tank is made up by, for example, hydrogen in the gaseous phase (gaseous hydrogen), increasing the possibility of gaseous hydrogen being entrained in the liquid hydrogen as it is extracted from the fuel tank. Embodiments of the hydrogen fuel tank discussed herein are configured to minimize or to eliminate the presence of such hydrogen boil-off vapors (gaseous hydrogen) entrained in the liquid hydrogen provided to the fuel system of the aircraft. As an aircraft does not only move, but also, changes pitch throughout a flight, the fuel tank discussed herein has been designed to address such challenges.

Figure 1:
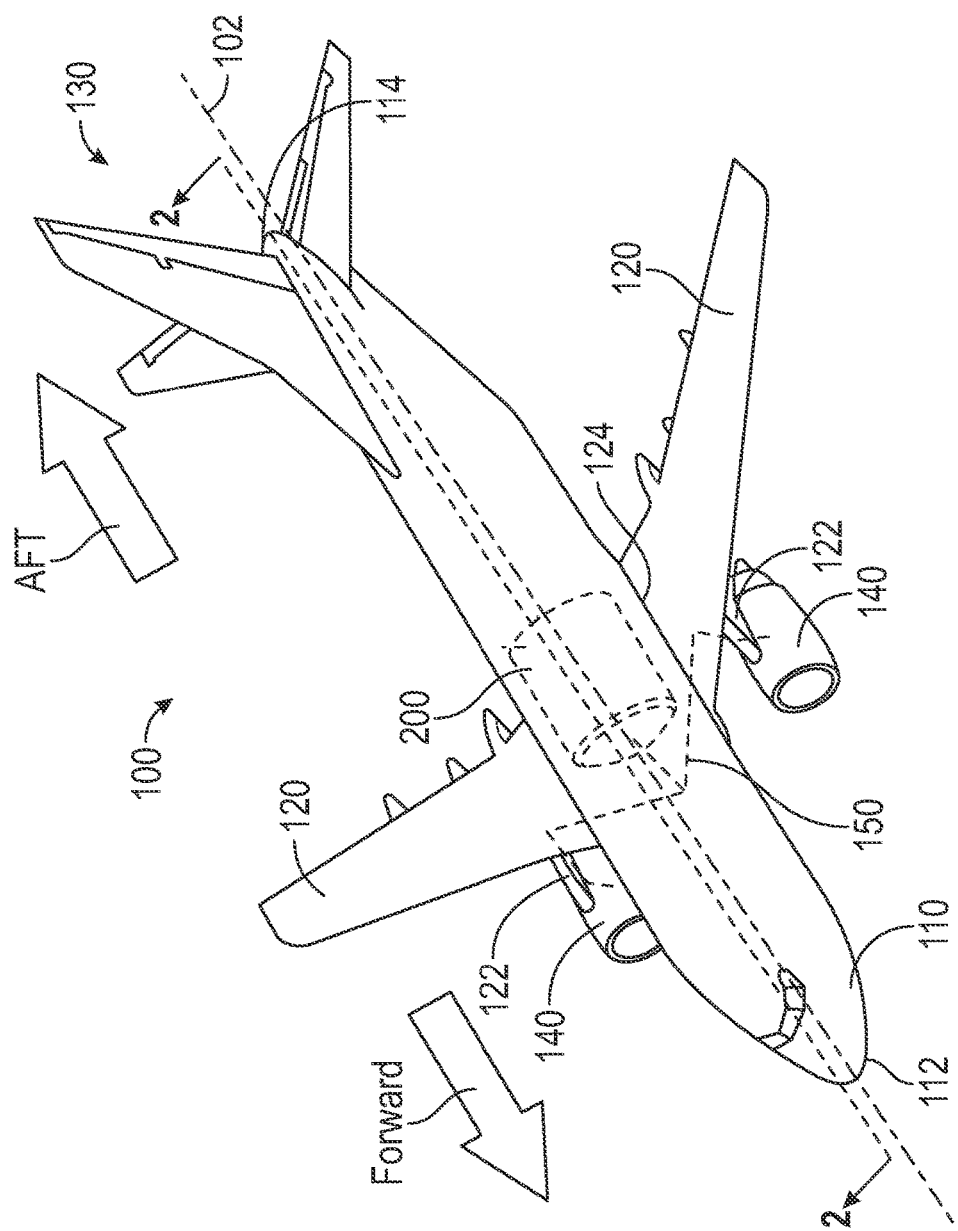
FIG. 1 is a perspective view of an aircraft, according to an embodiment of the present disclosure.

FIG. 1 is a perspective view of an aircraft 100 that may implement various preferred embodiments. The aircraft 100 includes a fuselage 110, wings 120 attached to the fuselage 110, and an empennage 130. In this embodiment, the aircraft 100 includes a pair of wings 120, one on the port side of the aircraft 100 (a port wing) and one on the starboard side of the aircraft 100 (a starboard wing). Although the aircraft 100 shown in FIG. 1 is an airplane, the embodiments described herein may also be applicable to other fixed-wing aircraft, including, unmanned aerial vehicles (UAV). The fuselage 110 includes a nose 112 and a tail 114 with a centerline 102 extending from the nose 112 to the tail 114. In this embodiment, the aircraft 100 is symmetrical about the centerline 102. The aircraft 100 includes a forward direction, which is a direction toward the nose 112 from onboard the aircraft 100, and an aft direction, which is a direction toward the tail 114 from onboard the aircraft 100.

The aircraft 100 also includes a propulsion system that produces a propulsive thrust required to propel the aircraft 100 in flight, during taxiing operations, and the like. The propulsion system for the aircraft 100 shown in FIG. 1 includes a pair of engines 140. In this embodiment, each engine 140 is attached to one of the wings 120 by a pylon 122 in an under-wing configuration. Although the engines 140 are shown attached to the wing 120 in an under-wing configuration in FIG. 1, in other embodiments, the engine 140 may have alternative configurations and be coupled to other portions of the aircraft 100. For example, the engine 140 may additionally or alternatively include one or more aspects coupled to other parts of the aircraft 100, such as, for example, the empennage 130 and the fuselage 110.

The engines 140 shown in FIG. 1 are gas turbine engines that are each capable of selectively generating a propulsive thrust for the aircraft 100. The amount of propulsive thrust may be controlled at least in part based on a volume of fuel provided to the gas turbine engines 140 via a fuel system. The fuel is stored in a fuel tank 200 of the fuel system and the fuel used in the gas turbine engine 140 is hydrogen fuel. The fuel system includes a fuel delivery assembly 150 providing the fuel flow from the fuel tank 200 to the engine 140, and, more specifically, to a fuel manifold of the combustion section of the turbomachine of the gas turbine engine 140. The fuel delivery assembly 150 includes tubes, pipes, and the like, to fluidly connect the various components of the fuel system to the gas turbine engine 140. The fuel delivery assembly 150 may also include various other components and systems used to distribute the hydrogen fuel in the aircraft 100 and to the gas turbine engines 140, such as pumps, vaporizers, and the like.

Although the embodiments described herein describe a fuel tank 200 used to provide hydrogen fuel that will be combusted in the gas turbine engine 140, the embodiments of the fuel tank 200 described herein may also be applicable to other applications where hydrogen is used as a fuel in the aircraft 100. The embodiments described herein also may be applicable engine other than gas turbine engines. Further, the engine, specifically, the gas turbine engine 140, is an example of a power generator for powering the aircraft 100 using hydrogen as a fuel, but hydrogen may be used as a fuel for other power generators. For example, the power generator may be a fuel cell (hydrogen fuel cell) where the hydrogen is provided to the fuel cell to generate electricity by reacting with air.

The fuel tank 200 is configured to hold the hydrogen fuel at least partially within the liquid phase and is configured to provide hydrogen fuel to the fuel delivery assembly 150 substantially completely in the liquid phase, such as completely in the liquid phase. The fuel tank 200 has a fixed volume and contains a volume of the hydrogen fuel in the liquid phase (liquid hydrogen fuel). As the fuel tank 200 provides hydrogen fuel to the fuel delivery assembly 150 substantially completely in the liquid phase, the volume of the liquid hydrogen fuel in the fuel tank 200 decreases and the remaining volume in the fuel tank 200 is made up by, for example, hydrogen substantially completely in the gaseous phase (gaseous hydrogen). As used herein, the term "substantially completely" is used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 200 at very low (cryogenic) temperatures. For example, the hydrogen fuel may be stored in the fuel tank 200 at about −253 degrees Celsius (twenty degrees Kelvin) or less at atmospheric pressure, or at other temperatures and pressures to maintain the hydrogen fuel substantially completely in the liquid phase. In some embodiments, the hydrogen fuel may be stored in the fuel tank 200 at temperatures from −259 degrees Celsius (fourteen degrees Kelvin) to −243 degrees Celsius (thirty degrees Kelvin), and more preferably, from −253 degrees Celsius (twenty degrees Kelvin) to −243 degrees Celsius (thirty degrees Kelvin). As noted above, storing the hydrogen fuel in the liquid phase and with a volume sufficient to power the aircraft 100 for a range of a typical commercial flight, for example, requires a fuel tank 200 larger than that used for Jet-A fuel. As shown in FIG. 1, at least a portion of the fuel tank 200 is located in the fuselage 110, and, in this embodiment, entirely within the fuselage 110, instead of in the wings 120.

Each wing 120 is attached to the fuselage 110 in this embodiment at an attachment point 124. As the aircraft 100 is propelled through the air, the wings 120 generate lift and the resultant lift acts on the aircraft 100 at a wing center of lift (sometimes also referred to as a center of pressure).

FIG. 2 is a cross section of the fuselage 110 taken along line 2-2 in FIG. 1. The wing center of lift is marked with the reference character CL shown in FIG. 2. In this embodiment, a single fuel tank 200 is used, and the fuel tank 200 is located entirely within the fuselage 110. The fuel tank 200 is located within the fuselage such that, relative to the forward direction and the aft direction, the fuel tank 200 is located at the wing center of lift CL. As noted above, the aircraft 100 of this embodiment is symmetrical about the centerline 102 and the wing center of lift CL is located on the centerline 102. Locating the fuel tank 200 at the wing center of lift CL promotes the stability of the aircraft during flight. The aircraft 100 shown in FIG. 2 is a commercial, passenger aircraft that includes a cockpit 116 for operating the aircraft 100 and at least one passenger compartment 118. In this embodiment, the aircraft 100 includes two passenger compartments 118, an aft passenger compartment 118a and a forward passenger compartment 118b, and the fuel tank 200 separates the aft passenger compartment 118a from the forward passenger compartment 118b. Although the aircraft 100 shown in FIG. 2 is a passenger aircraft, the embodiments described herein may also be applicable to other aircraft such as cargo aircraft, for example.

Figure 3:
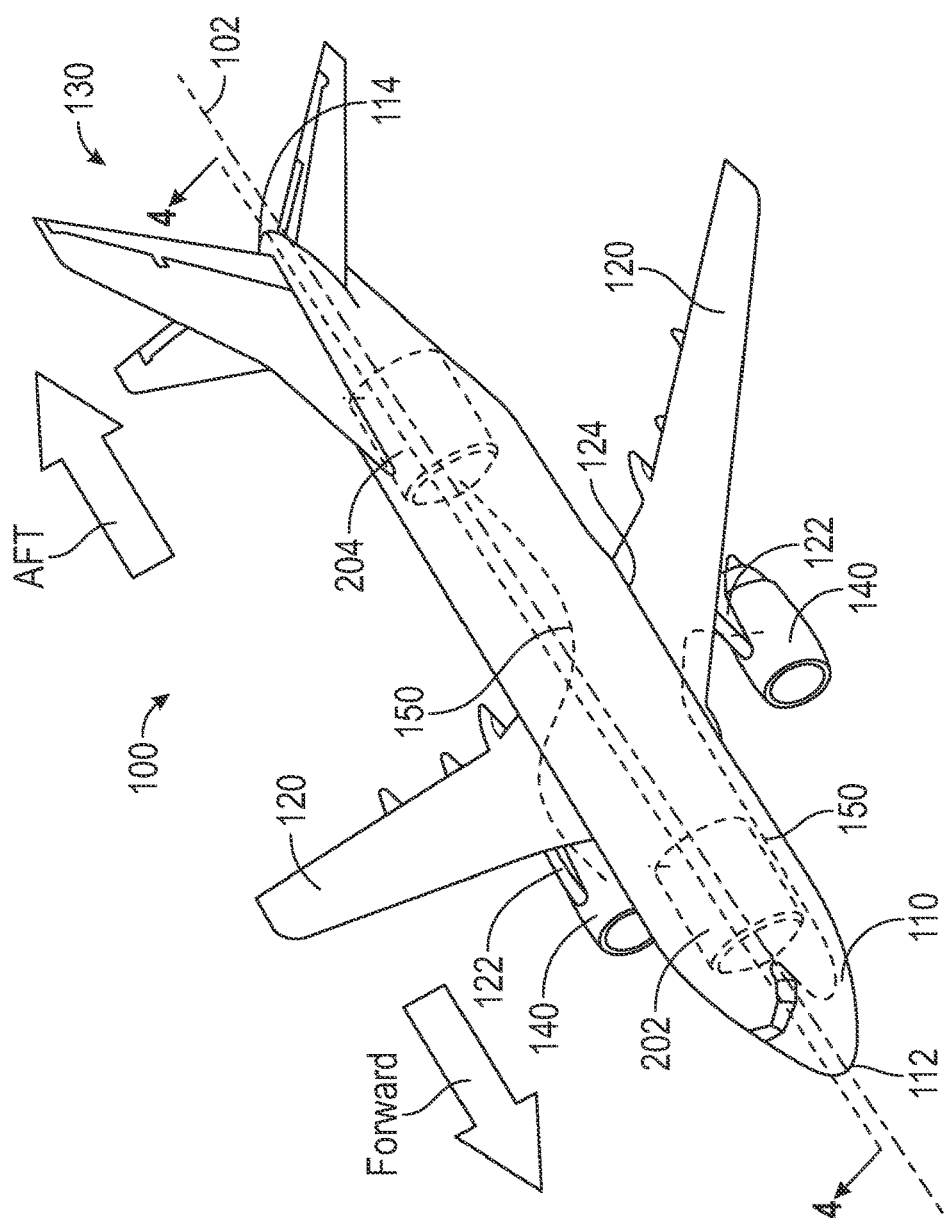
FIG. 3 is a perspective view of the aircraft having a plurality of fuel tanks.

FIG. 3 is a perspective view of another embodiment of the aircraft 100 having a plurality of fuel tanks 200. Any suitable number of fuel tanks 200 may be used, but as noted above, minimizing the number of fuel tanks 200 discussed herein minimizes the amount of weight from the fuel tanks 200. The aircraft 100 shown in FIG. 3 includes two fuel tanks 200, a forward fuel tank 202 and an aft fuel tank 204. But for the position within the aircraft 100 and the size, the description of the fuel tank 200 below applies to the forward fuel tank 202 and the aft fuel tank 204.

Figure 4:
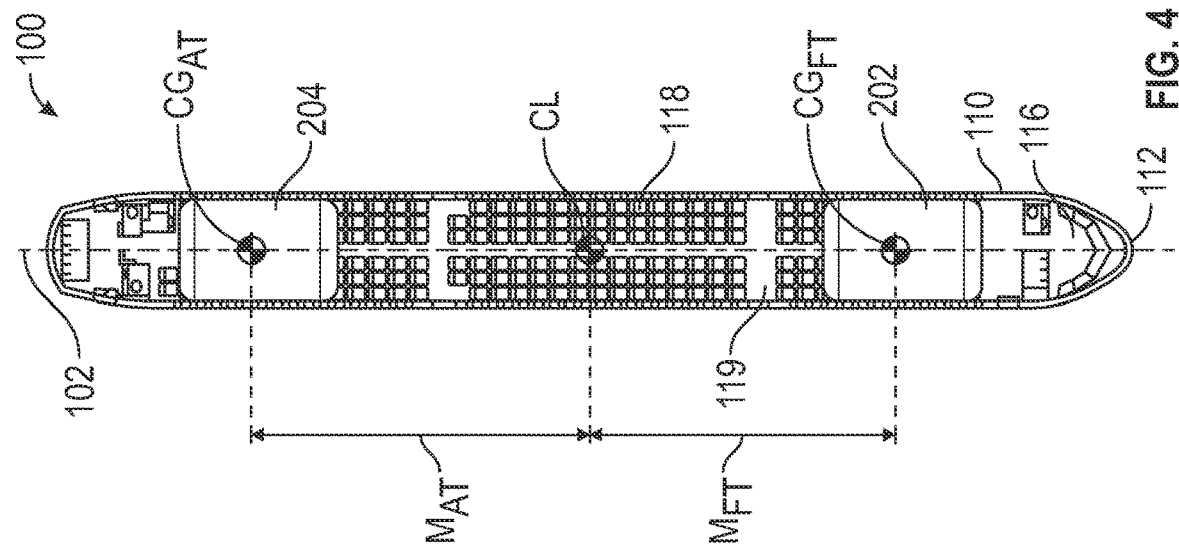
FIG. 4 is a cross section of a fuselage of the aircraft shown in FIG. 3 taken along line 4-4 in FIG. 3.

FIG. 4 is a cross section of the fuselage 110 taken along line 4-4 in FIG. 3. Preferably the forward fuel tank 202 and the aft fuel tank 204 are positioned in the fuselage 110 about the wing center of lift CL in the forward direction and the aft direction such that the forward fuel tank 202 and the aft fuel tank 204 balance each other and promote the stability of the aircraft 100 during flight. More specifically, the forward fuel tank 202 includes a center of gravity $CG_{FT}$ when filled to capacity with hydrogen fuel in a liquid phase. The forward fuel tank 202 also includes a moment arm $M_{FT}$ from the wing center of lift CL to the center of gravity $CG_{FT}$ of the forward fuel tank 202. Likewise, the aft fuel tank 204 includes a center of gravity $CG_{AT}$ when filled to capacity with hydrogen fuel in a liquid phase. The aft fuel tank 204 also includes a moment arm $M_{AT}$ from the wing center of lift CL to the center of gravity $CG_{AT}$ of the aft fuel tank 204. The forward fuel tank 202 and the aft fuel tank 204 are located within the fuselage 110 such that the moment arm $M_{FT}$ of the forward fuel tank 202 balances the moment arm $M_{AT}$ of the aft fuel tank 204. When the forward fuel tank 202 and the aft fuel tank 204 are the same size and have the same geometry, for example, the forward fuel tank 202 and the aft fuel tank 204 may be placed the same distance forward and aft, respectively, of the wing center of lift CL.

As with the aircraft 100 shown in FIG. 2, the aircraft 100 shown in FIG. 4 is a commercial, passenger aircraft that includes a cockpit 116 and at least one passenger compartment 118. In this embodiment, the forward fuel tank 202 may be placed just aft of the cockpit 116 separating the cockpit 116 from the passenger compartment 118, with the aft fuel tank 204 being located in an aft section of the aircraft 100 proximate to the empennage 130 (FIG. 3) and the tail 114 (FIG. 3). By such positioning, the aircraft 100 may include one passenger compartment 118 with the cockpit 116 being accessed by a separate door.

Figure 5:
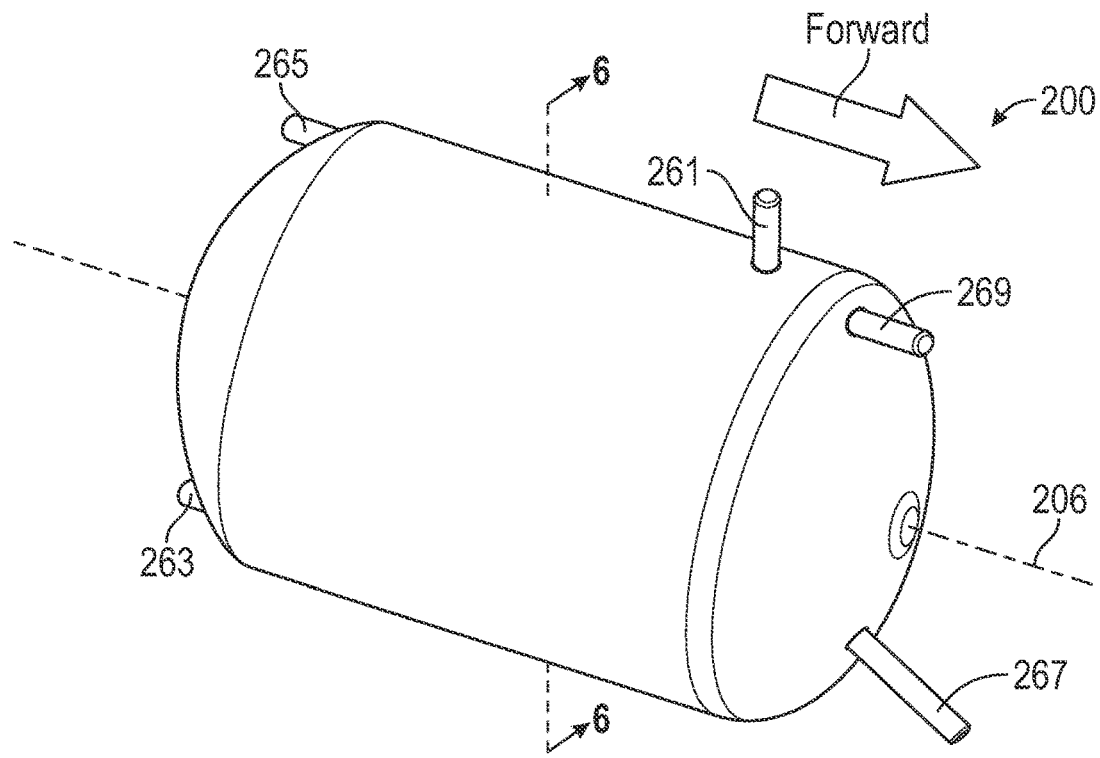
FIG. 5 is a perspective view of a fuel tank, according to an embodiment of the present disclosure.
Figure 6:
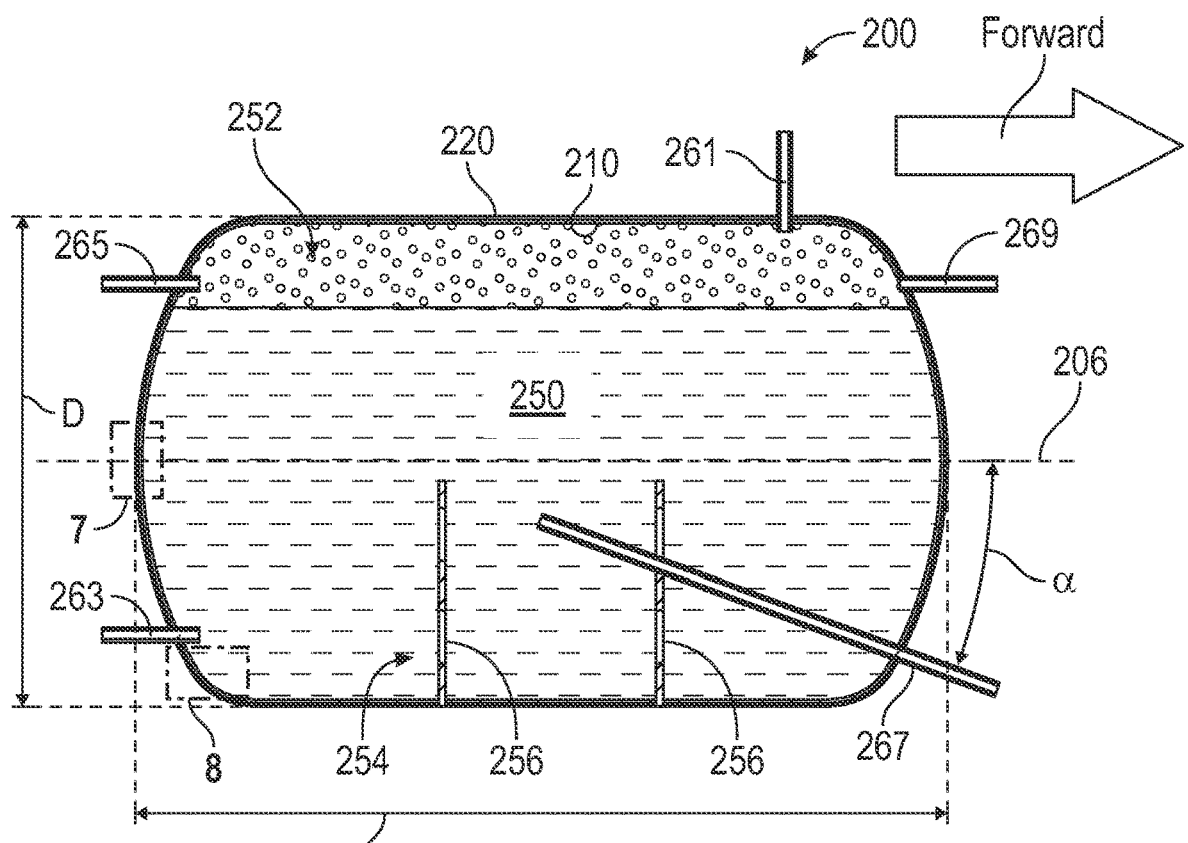
FIG. 6 is a cross section of the fuel tank shown in FIG. 5 taken along line 6-6 in FIG. 5.

Referring now to FIGS. 5 and 6, wherein FIG. 5 is a perspective view of an embodiment of the fuel tank 200 used in the aircraft 100 discussed herein and FIG. 6 is a cross section of the fuel tank 200 taken along line 6-6 in FIG. 5. The fuel tank 200 is configured to hold the hydrogen fuel in a liquid phase. In this embodiment, the fuel tank 200 is cylindrical and has an outer diameter D. The fuel tank 200 also includes a longitudinal axis 206 and a length L in the direction of the longitudinal axis 206. In this embodiment, the length L is greater than the diameter D. The fuel tank 200 is oriented in FIGS. 1 to 4 with the longitudinal axis 206 being oriented parallel to the centerline 102 of the aircraft 100, and in some embodiments, the longitudinal axis 206 may be coincident with the centerline 102 of the aircraft 100. With the fuel tanks 200 being located within the fuselage 110 as discussed above and shown in FIGS. 1 to 4, the outer diameter of the fuel tank 200 can be maximized to avoid additional weight as compared to having a smaller diameter fuel tank 200. Preferably, a ratio of the outer diameter of the fuel tank to the maximum internal diameter of the fuselage (tank-to-fuselage ratio) is from eight-tenths to nine-tenths, and example diameters D of the fuel tank 200 for existing airframes are shown in Table 1 below.

TABLE 1

| Aircraft | Maximum Internal Diameter of the Fuselage (ft) | Outer Diameter D of Fuel Tank (ft) | Tank-to-Fuselage Ratio |
|---|---|---|---|
| Embraer E175 | 9.0 | 8 | 0.89 |
| Airbus A320 | 11.9 | 10 | 0.84 |
| Boeing 787 | 17.9 | 15 | 0.84 |

Figure 7:
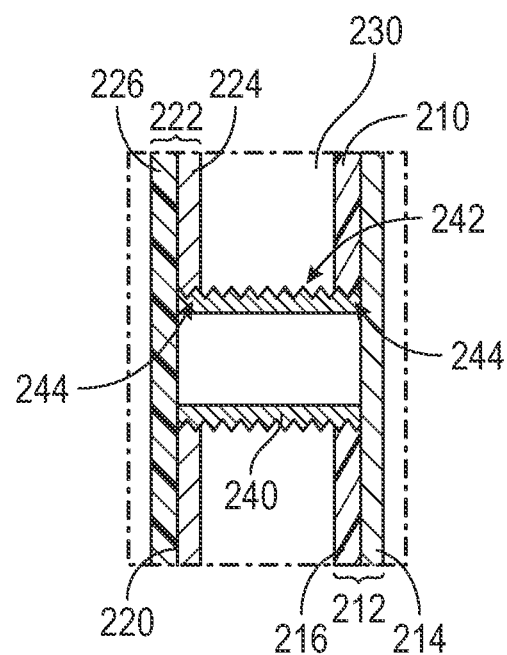
FIG. 7 is a detail view of the fuel tank showing detail 7 in FIG. 6.
Figure 8:
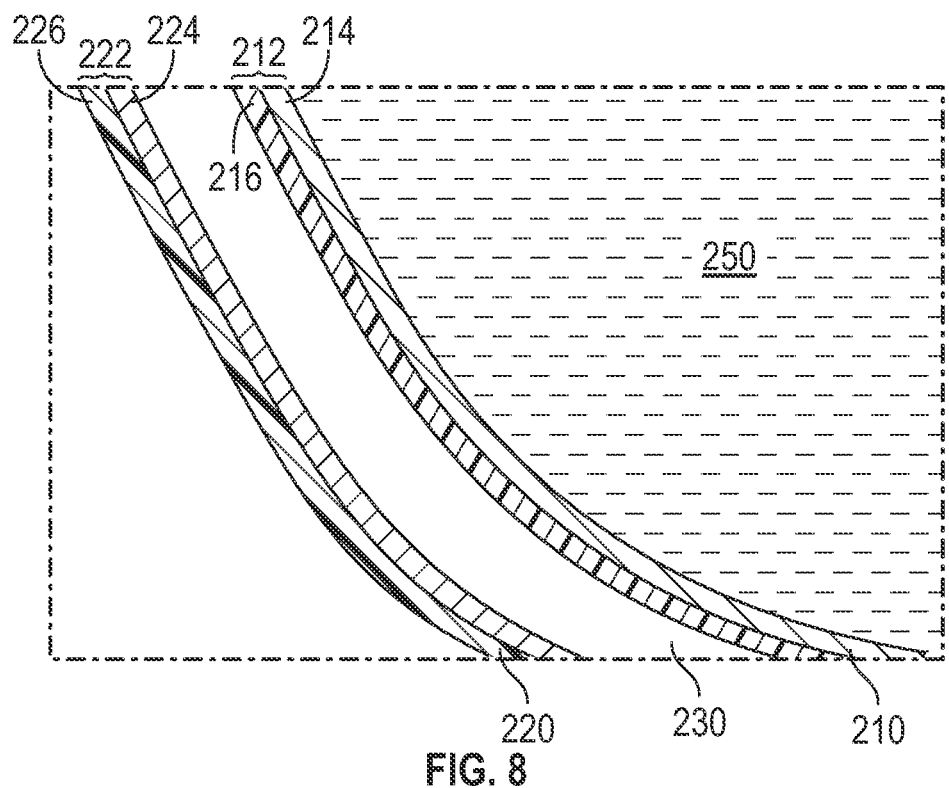
FIG. 8 is a detail view of the fuel tank showing detail 8 in FIG. 6.

Referring more specifically to FIG. 6, to store the hydrogen fuel in the liquid phase, the fuel tank 200 stores and maintains the hydrogen cryogenically and may be a cryostat. The fuel tank 200 of this embodiment is a lightweight, dual wall tank, and includes an inner vessel 210 (inner cryogenic liquid tank) and an outer vessel 220 (vacuum vessel). FIGS. 7 and 8 are detail views showing details 7 and 8, respectively, in FIG. 6. As shown in FIGS. 7 and 8, the inner vessel 210 has an inner vessel wall 212, and the outer vessel 220 also has an outer vessel wall 222. The inner vessel 210 is positioned within the outer vessel 220 with a gap 230 formed between the inner vessel 210 and the outer vessel 220. More specifically, the gap 230 is formed between the inner vessel wall 212 and the outer vessel wall 222. The inner vessel 210 is positioned within the outer vessel 220 and connected to the outer vessel 220 by a suspension 240, as will be discussed further below.

As shown in FIG. 6, the inner vessel wall 212 defines a chamber 250 in which the hydrogen fuel in the liquid phase (liquid hydrogen) is stored. As noted above, some amount of gaseous hydrogen will also be present in the chamber 250. The chamber 250 includes an upper portion 252 and a lower portion 254. The gaseous hydrogen will collect in the upper portion 252 of the chamber 250 and the liquid hydrogen will be located in the lower portion 254 of the chamber 250. As the fuel tank 200 provides hydrogen fuel, the volume of the liquid hydrogen fuel in the fuel tank 200 decreases, with the remaining volume in the fuel tank made up of gaseous hydrogen.

FIG. 7 is a detail view showing detail 7 in FIG. 6. FIG. 7 is a detail view of the fuel tank 200, showing the suspension 240. In this embodiment, the suspension 240 connects longitudinal ends of the inner vessel 210 to longitudinal ends of the outer vessel 220. Here, the suspension 240 is a hollow tube with threads 242 on at least each end. The threads 242 of the suspension 240 engage with threads 244 formed in each of the inner vessel 210 and the outer vessel 220. Preferably, the suspension 240 is made from a material having a low thermal conductivity, such as a composite material like carbon fiber. The hollow, composite tubes are advantageous as they reduce thermal losses. Other suitable suspensions may be used to position the inner vessel 210 within the outer vessel 220 with the gap 230 formed therebetween. Such other suspensions include, for example, radial straps.

FIG. 8 is a detail view of the fuel tank 200, showing the inner vessel wall 212, the gap 230, and the outer vessel wall 222. FIG. 8 is a detail view showing detail 8 in FIG. 6. The inner vessel wall 212 is a multi-layer wall, having an inner layer 214 and an outer layer 216. The inner layer 214 is preferably metal, such as aluminum or steel, and the outer layer 216 is preferably a composite material, such as a carbon fiber composite. The carbon fiber outer layer 216 provides strength to the inner vessel 210 at a relatively low weight, which is preferred for the aircraft application discussed herein. Hydrogen may diffuse through the carbon fiber composite material, and the carbon fiber may become embrittled because of the cryogenic temperatures and hydrogen diffusing through the carbon fiber composite material if the carbon fiber composite material is used alone as the inner vessel 210. The metal inner layer 214 acts as a diffusion barrier for the hydrogen located in the chamber 250 and is a structural member of the inner vessel wall 212. Preferably, the inner layer 214 is at least two millimeters thick, and, more preferably, at least three millimeters thick. Thinner materials may not provide a sufficient diffusion barrier for hydrogen, nor would they be suitable to act as a structural member of the inner vessel wall 212. In this embodiment, the outer layer 216 may be from three millimeters thick to eight millimeters thick.

The outer vessel wall 222 also is a multi-layer wall, having an inner layer 224 and an outer layer 226. Based on the similar considerations as discussed above for the inner vessel wall 212, the inner layer 224 of the outer vessel wall 222 is preferably metal, such as aluminum or steel, and the outer layer 226 of the outer vessel wall 222 is preferably a carbon fiber composite material. Each of the inner layer 224 and the outer layer 226 may have the preferred thicknesses discussed above.

As noted above, the inner vessel 210 is positioned within the outer vessel 220 with the gap 230 formed between the inner vessel 210 and the outer vessel 220 and, more specifically, between the inner vessel wall 212 and the outer vessel wall 222. To provide thermal isolation for the inner vessel 210, the gap 230 is under vacuum, such as from one millitorr to one microtorr. The gap 230 may include void space or be an entirely void space, but, in this embodiment, the gap 230 includes multi-layer insulation (MLI) in the gap 230. Any suitable multi-layer insulation known in the art may be used, such as aluminized Mylar®, for example.

Figure 9:
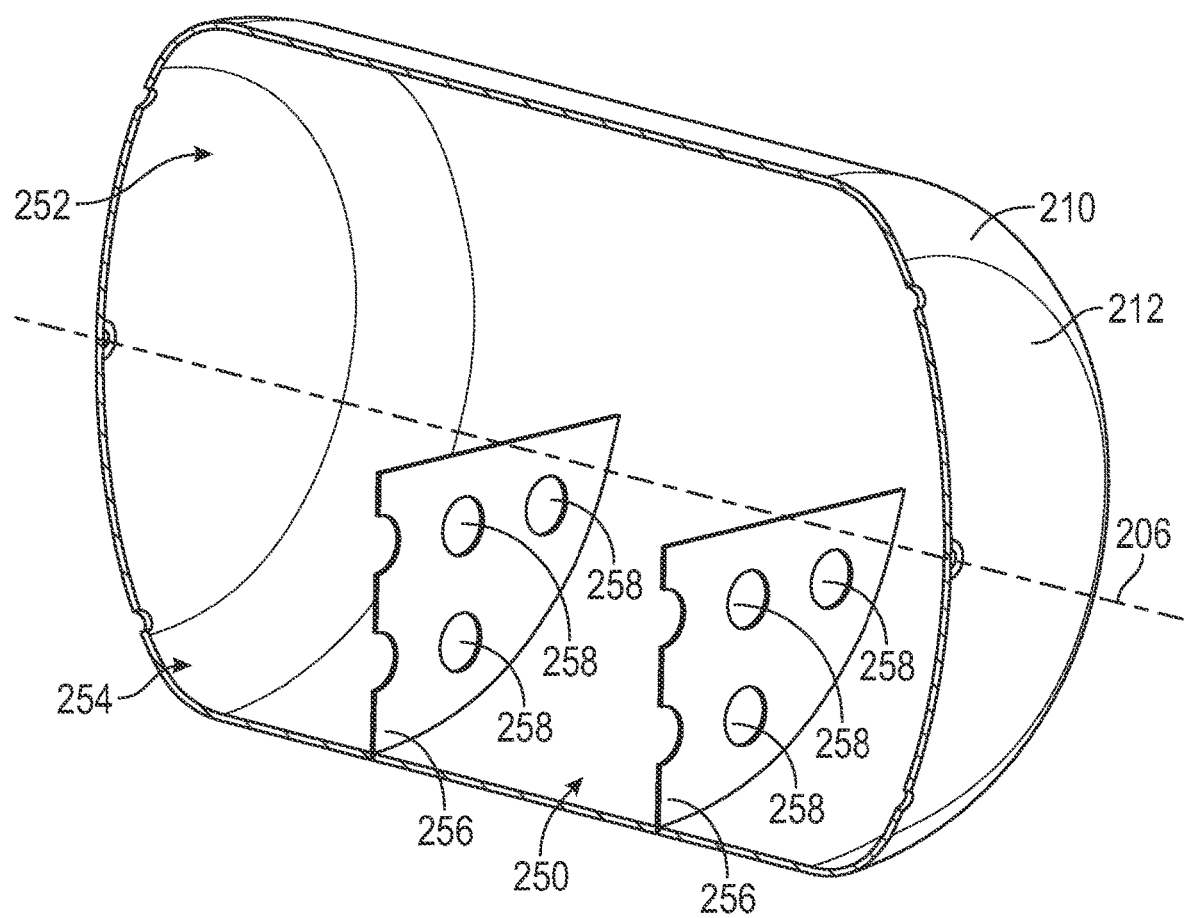
FIG. 9 is a cross-sectional perspective view of an inner vessel of the fuel tank shown in FIG. 5 taken along line 6-6 in FIG. 5. Fluid lines of the fuel tank are omitted from FIG. 9.

FIG. 9 is a cross-sectional perspective view of the inner vessel 210 taken along line 6-6 in FIG. 5. In FIG. 9, the outer vessel 220 and fluid lines (discussed further below) of the fuel tank 200 are omitted. The fuel tank 200 includes a plurality of baffles 256 located in the chamber 250. In this embodiment, each baffle 256 is located in the lower portion 254 of the chamber 250. Each baffle 256 of this embodiment is a plate. Each baffle 256 may be oriented in a direction transverse to the longitudinal axis 206 of the fuel tank 200, and, more specifically, perpendicular to the longitudinal axis 206 of the fuel tank 200. Each baffle 256 also includes a plurality of holes 258 formed in the plate. Each hole 258 is preferably a through-hole allowing the liquid hydrogen to flow therethrough. Although shown as circular in FIG. 9, the holes 258 may have any suitable geometry. The baffles 256 are positioned within the chamber 250 and configured to restrict the flow of the liquid hydrogen in the forward direction and the aft direction, which helps prevent sloshing during operation of the aircraft 100.

As shown in FIGS. 5 and 6, the fuel tank 200 of this embodiment includes a plurality of fluid lines. Each of these fluid lines fluidly connects the chamber 250 to outside of the fuel tank 200 and penetrates each of the inner vessel wall 212 and the outer vessel wall 222. The fluid lines may be any suitable fluid line, such as a pipe, tube, conduit, etc., suitable for the application. One fluid line is a gaseous hydrogen extraction line 261. As noted above, gaseous hydrogen may collect in the upper portion 252 of the chamber 250. The gaseous hydrogen extraction line 261 is fluidly connected to the upper portion 252 of the chamber 250, and, in this embodiment, extends radially outward from the fuel tank 200. The gaseous hydrogen extraction line 261 may be used to remove (extract) the gaseous hydrogen from the chamber 250, such as by venting the chamber 250 to the atmosphere. The gaseous hydrogen extraction line 261 may be used to regulate the pressure in the chamber 250. A suitable control valve, such as a pressure control valve, may be located in the gaseous hydrogen extraction line 261 to regulate the pressure and to control venting the chamber 250.

The fuel tank 200 is filled using at least one liquid hydrogen fill line 263, 265. In this embodiment, the fuel tank 200 includes two liquid hydrogen fill lines, a lower liquid hydrogen fill line 263 and an upper liquid hydrogen fill line 265. Each of the lower liquid hydrogen fill line 263 and the upper liquid hydrogen fill line 265 may extend from the chamber 250 to a coupling located on the exterior of the aircraft 100, such as on the exterior of the fuselage 110. A valve may be incorporated into the coupling or placed between the coupling and the chamber 250. A liquid hydrogen source is coupled to the coupling and the valve opened to fill the fuel tank 200 with liquid hydrogen. The lower liquid hydrogen fill line 263 is fluidly connected to the chamber 250 at the lower portion 254 and may be used to fill the fuel tank 200 from the bottom (bottom fill). The upper liquid hydrogen fill line 265 is fluidly connected to the chamber 250 at the upper portion 252 and may be used to fill the fuel tank 200 from the top (top fill). In some embodiments, one of the lower liquid hydrogen fill line 263 and the upper liquid hydrogen fill line 265 may be used to fill the fuel tank 200. In other embodiments, both the lower liquid hydrogen fill line 263 and the upper liquid hydrogen fill line 265 may be used simultaneously to fill the fuel tank 200 with a favorable hydrogen quality, such as desired temperatures, pressures and degrees of saturation for the hydrogen in the fuel tank 200.

A fuel extraction line 267 is fluidly coupled to the chamber 250 and the fuel delivery assembly 150 to provide hydrogen fuel to the fuel delivery assembly 150. The fuel tank 200, more specifically, the chamber 250, is fluidly coupled to the fuel delivery assembly 150 by the fuel extraction line 267. As the fuel tank 200 provides hydrogen fuel, the volume of the liquid hydrogen fuel in the fuel tank 200 decreases, and the fuel extraction line 267 is fluidly coupled to the chamber 250 at the lower portion 254 of the chamber 250.

Figure 10:
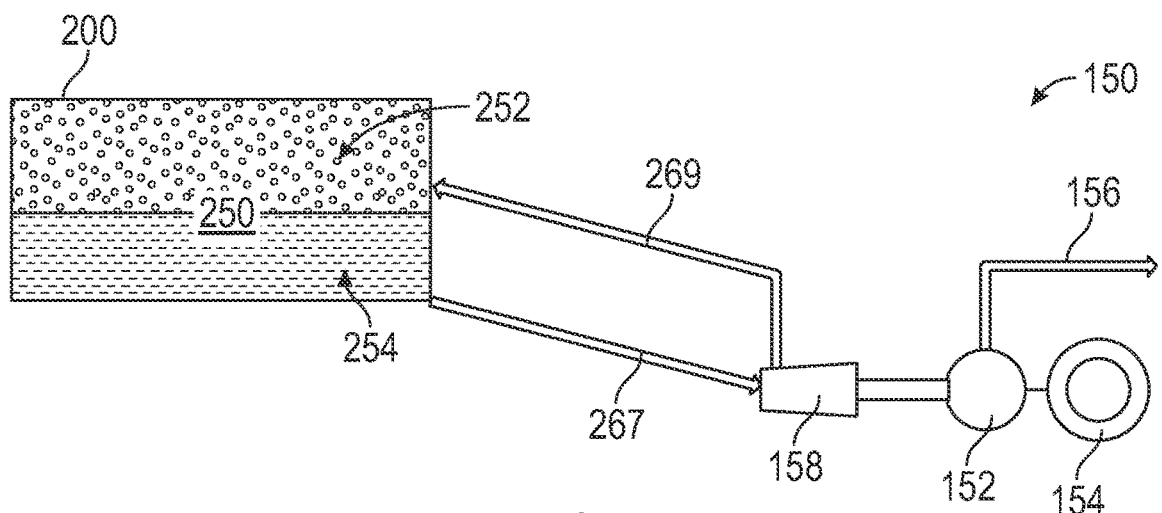
FIG. 10 is a schematic showing the connection of the fuel tank of FIG. 5 to a fuel delivery assembly of the aircraft.

FIG. 10 is a schematic view showing the connection of the fuel tank 200 to the fuel delivery assembly 150. The fuel delivery assembly 150 of this embodiment includes a liquid hydrogen pump 152, including a motor 154, to distribute the liquid hydrogen in the fuel delivery assembly 150. A discharge line 156 fluidly connects the liquid hydrogen pump 152 to the downstream components of the fuel delivery assembly 150.

A suction adaptor 158 is located upstream of the liquid hydrogen pump 152 and fluidly connects the fuel extraction line 267 to the liquid hydrogen pump 152. To the extent that any gaseous hydrogen is entrained in the liquid hydrogen flowing through the fuel extraction line 267 to the liquid hydrogen pump 152, the suction adaptor 158 is configured to separate the gaseous hydrogen from the liquid hydrogen, and the gaseous hydrogen is recirculated back to the fuel tank 200, and, more specifically, the chamber 250, by a hydrogen vapor return line 269. In this embodiment, the hydrogen vapor return line 269 is fluidly connected to the chamber 250 at the upper portion 252 of the chamber 250 to return the gaseous hydrogen to the vapor space within the chamber 250. The hydrogen vapor return line 269 fluidly connects the liquid hydrogen pump 152, and more specifically the suction adaptor 158, to the fuel tank 200.

In this embodiment, the hydrogen vapor return line 269 maintains a positive slope from the liquid hydrogen pump 152, and more specifically the suction adaptor 158, to the fuel tank 200 to enable the vapor return by buoyancy driven flow. In some embodiments, the hydrogen vapor return line 269 extends in the forward direction of the aircraft 100 and has a downward angle relative to the longitudinal axis 206 of the fuel tank 200 to maintain the positive slope from the liquid hydrogen pump 152 during all normal operating conditions of the aircraft 100. The discussion of the downward angle α of the fuel extraction line 267, below, also applies to the downward angle of the hydrogen vapor return line 269.

The fluid lines discussed herein, particularly those conveying liquid hydrogen such as the lower liquid hydrogen fill line 263 and the fuel extraction line 267, may be vacuum jacketed pipes. The fluid lines discussed herein may be made of any suitable material, including metal, and/or have metallic portions. Using metal (or metallic portions) for the fluid lines, such as the fuel extraction line 267, enables the fluid lines to be welded to the metallic inner layer 214 of the inner vessel wall 212 and the metallic inner layer 224 of the outer vessel wall 222 (FIGS. 6 to 8).

As can be seen in FIG. 10, the liquid hydrogen pump 152 and the suction adaptor 158 are located at an elevation in the aircraft 100 lower than the fuel tank 200, and, more specifically, lower than the bottom of the chamber 250. By such a position, the liquid hydrogen in the fuel tank 200 provides a net positive pressure (head) to the liquid hydrogen pump 152 and the suction adaptor 158. In this embodiment, the net positive pressure head cam be calculated by $P=\rho_{LH2} \times g \times h$, where $\rho_{LH2}$ is the density of liquid hydrogen, g is acceleration of gravity (gravity constant), and h height difference between upstream and downstream point.

As shown in FIG. 6, the fuel extraction line 267 has a downward angle α relative to the longitudinal axis 206 of the fuel tank 200 to further provide a net positive pressure. The fuel extraction line 267 also has a downward angle relative to the centerline 102 of the aircraft 100. As the centerline 102 of the aircraft 100 and the longitudinal axis 206 of the fuel tank 200 are parallel to each other, the downward angle relative to the centerline 102 of the aircraft 100 is the same as the angle α. As noted above, the aircraft 100 may be a commercial, passenger aircraft having at least one passenger compartment 118. The passenger compartment 118 (and/or the cockpit 116) may include a floor 119 (see FIGS. 2 and 4). The floor 119 may be parallel to the centerline 102 of the aircraft 100. The fuel extraction line 267 extends at a downward angle relative to the floor 119 with the downward angle relative to the floor 119 being the same as the angle α.

The fuel extraction line 267 of this embodiment is designed to provide the net positive pressure during all normal operating conditions of the aircraft 100, and preferably the downward angle α is set such that the fuel extraction line 267 is downward during all normal operating conditions.

Figure 11A:
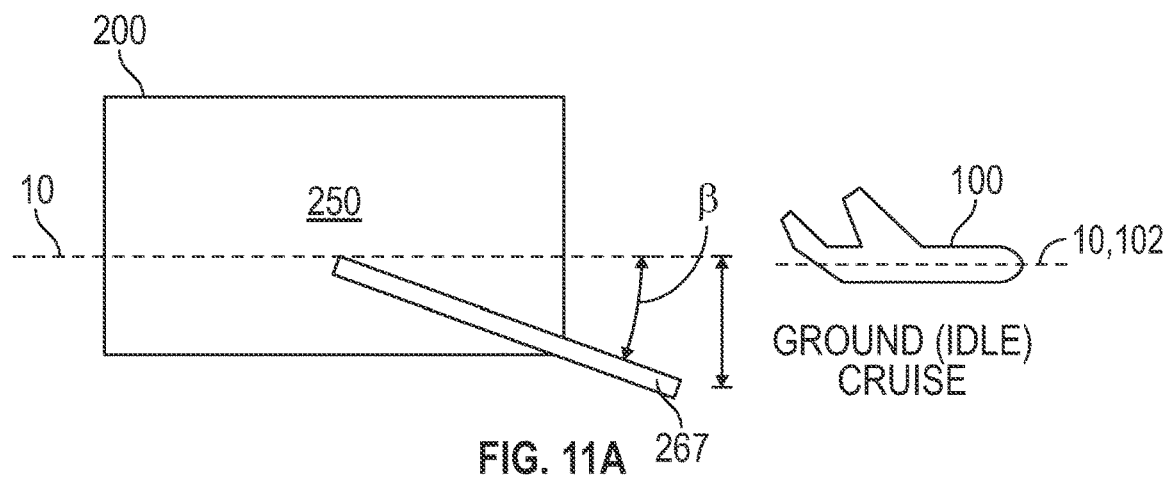
FIGS. 11A to 11C are schematic views illustrating normal operating conditions of the aircraft and an angle of a fuel extraction line of the fuel tank shown in FIG. 5 during those conditions.
Figure 11B:
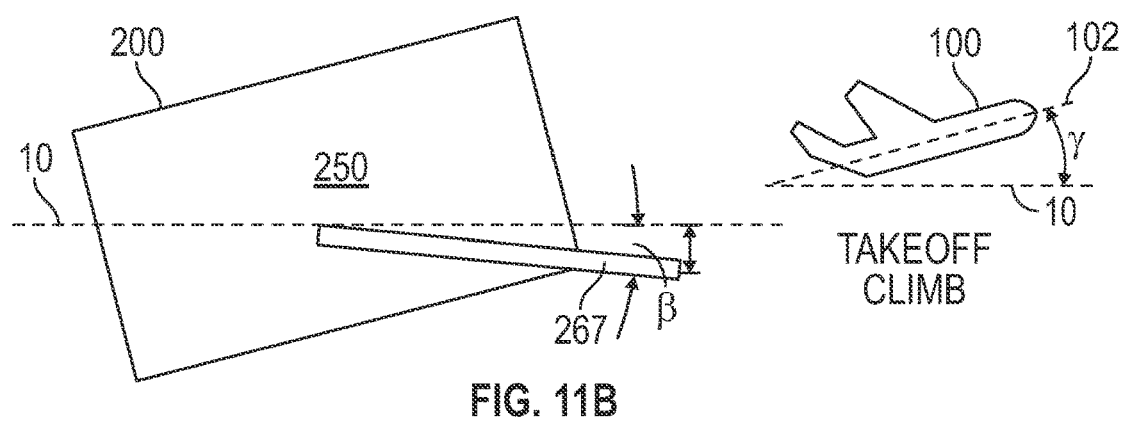
Figure 11C:
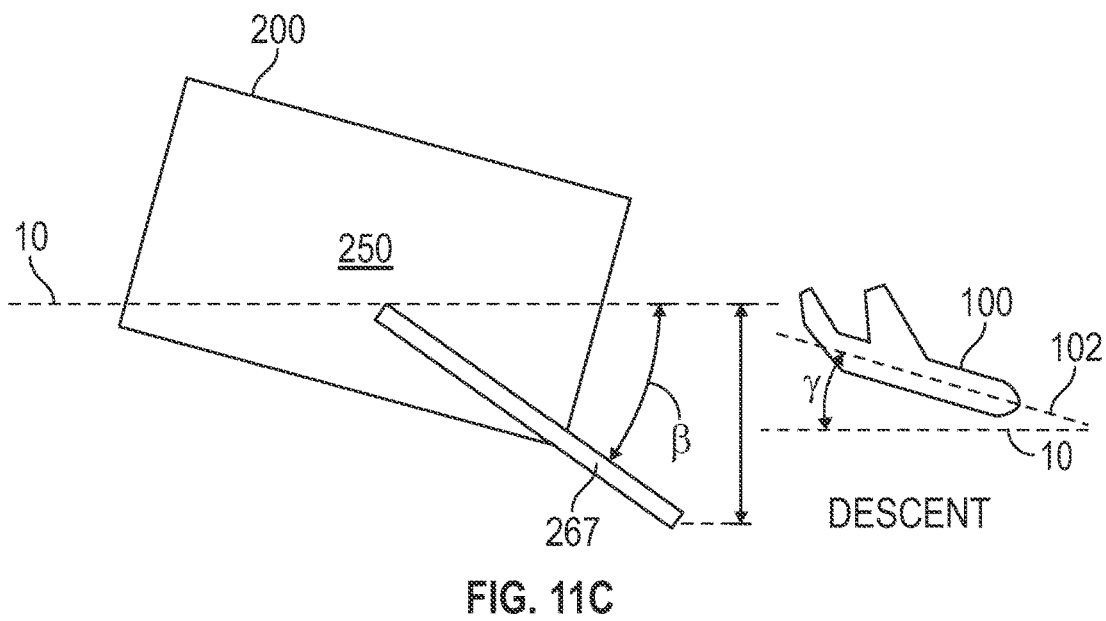

FIGS. 11A to 11C are schematic views illustrating the normal operating conditions of the aircraft 100 and an angle β of the fuel extraction line 267 relative to a horizontal plane 10 during those conditions. FIGS. 11A to 11C also illustrate the pitch (angle γ) of the aircraft 100 during these conditions. The pitch (angle γ) of the aircraft 100 may be the angle between the horizontal plane 10 and the centerline 102 of the aircraft 100. Table 2 below shows an expected upper bound for the pitch (angle γ) of a commercial, passenger aircraft during the various normal operating conditions. The maximum pitch (angle γ) expected is twenty degrees.

TABLE 2

| Operating Condition | Pitch (Angle γ) of Aircraft (degrees) | Angle β of Fuel Extraction Line (degrees) |
|---|---|---|
| Ground (Idle) | 0 | 25 |
| Takeoff | 15 | 10 |
| Climb | 20 | 5 |
| Cruise | 0 | 25 |
| Descent | −5 | 30 |

In this embodiment, the angle α of the fuel extraction line 267 is preferably at least the maximum pitch of the aircraft 100, and, preferably, angle α is greater than twenty degrees. In other embodiments, the angle α is set to be at least five degrees greater than the maximum pitch of the aircraft 100, and, preferably, angle α is at least twenty-five degrees. For example, the fuel extraction line 267 may angle downward at an angle α of twenty-five degrees relative to the longitudinal axis 206 of the fuel tank 200 and the centerline 102 of the aircraft 100. In this example, the centerline 102 of the aircraft 100 is also parallel to the horizontal plane 10. At the beginning of a mission (flight), the aircraft 100 is on the ground and at idle, as illustrated in FIG. 11A. The fuel extraction line 267 is angled downward relative to the horizontal plane 10 (angle β) by twenty-five degrees, as shown in Table 2, with the aircraft 100 on the ground. During takeoff, the aircraft 100 may be pitched upward, as illustrated in FIG. 11B, by fifteen degrees, and the fuel extraction line 267 remains angled downward relative to the horizontal plane 10 (angle β) by ten degrees, as shown in Table 2. After takeoff, the aircraft 100 increases pitch to twenty degrees, and the fuel extraction line 267 still remains angled downward relative to the horizontal plane 10 (angle β) by five degrees, as shown in Table 2. The aircraft 100 levels off as it reaches a cruising altitude and returns to a horizontal (zero) pitch condition, as illustrated in FIG. 11A. During cruise, the fuel extraction line 267 is angled downward relative to the horizontal plane 10 (angle β) by twenty-five degrees, as shown in Table 2. When the aircraft 100 descends for landing, the pitch of the aircraft 100 is a negative five degrees, as illustrated in FIG. 11C, increasing the downward angle β of the fuel extraction line 267 relative to the horizontal plane 10 to thirty degrees, as shown in Table 2. In this example, the fuel extraction line 267 is angled downward relative to the horizontal plane 10 (angle β) through the duration of the flight.

In this embodiment, the fuel extraction line 267 is located on the forward end of the fuel tank 200 and extends in the forward direction of the aircraft 100. To the extent that the liquid hydrogen flows away from the fuel extraction line 267 when the pitch of the aircraft 100 is upward, such as during takeoff and climb, the volume of liquid hydrogen in the fuel tank 200 is near full and the upward pitch of the aircraft 100 does not prevent the supply of fuel to the fuel extraction line 267. As the flight progresses, the volume of the liquid hydrogen fuel in the fuel tank 200 decreases and may be near empty at the end of the flight. As the aircraft 100 descends, the liquid hydrogen fuel remaining in the fuel tank 200 flows toward the forward end of the fuel tank 200. With the fuel extraction line 267 located on the forward end of the fuel tank 200 and extending in the forward direction of the aircraft 100, the liquid hydrogen fuel flows toward the fuel extraction line 267 and continues to supply the fuel extraction line 267.

Further aspects of the present disclosure are provided by the subject matter of the following clauses.

An aircraft comprising a fuselage, a power generator, a fuel tank for holding fuel for the power generator, and a fuel delivery assembly. The fuselage has a centerline, a forward direction, and an aft direction. The power generator is configured to provide power to the aircraft. The fuel tank is positioned in the fuselage and configured to hold hydrogen fuel in a liquid phase. The fuel tank has (i) a chamber for holding the hydrogen fuel and (ii) a fuel extraction line fluidly coupled to the chamber. The fuel extraction line extends from the fuel tank in the forward direction and at a downward angle relative to the centerline of the fuselage. The fuel delivery assembly is fluidly coupled to the fuel extraction line and fluidly connects the fuel tank to the power generator. The fuel delivery assembly is configured to provide the hydrogen fuel from the fuel tank to the power generator.

The aircraft of any preceding clause, wherein the fuel tank includes at least one baffle in the chamber.

The aircraft of any preceding clause, wherein the downward angle is greater than twenty degrees.

The aircraft of any preceding clause, wherein the downward angle is at least twenty-five degrees.

The aircraft of any preceding clause, wherein the fuel extraction line is a vacuum jacketed pipe.

The aircraft of any preceding clause, wherein the fuel delivery assembly includes a liquid hydrogen pump. The fuel extraction line is fluidly connected to the liquid hydrogen pump. The fuel tank further includes a hydrogen vapor return line fluidly connecting the liquid hydrogen pump to the chamber to return gaseous hydrogen from the liquid hydrogen pump to the chamber. The hydrogen vapor return line extends from the fuel tank in the forward direction and at a downward angle relative to the centerline of the fuselage.

The aircraft of any preceding clause, wherein the fuselage includes a maximum internal diameter and the fuel tank is cylindrical having an outer diameter. A ratio of the outer diameter of the fuel tank to the maximum internal diameter of the fuselage is from eight-tenths to nine-tenths.

The aircraft of any preceding clause, wherein the power generator is a gas turbine engine.

The aircraft of any preceding clause, further comprising a pair of wings connected to the fuselage and configured to generate a wing center of lift. The fuel tank is located within the fuselage such that, relative to the forward direction and the aft direction, the fuel tank is located at the wing center of lift.

The aircraft of any preceding clause, wherein the fuel tank is a forward fuel tank. The aircraft further comprises a pair of wings connected to the fuselage and configured to generate a wing center of lift. The forward fuel tank is located forward of the wing center of lift. The aircraft further comprises an aft fuel tank configured to hold hydrogen fuel in a liquid phase. The aft fuel tank has (i) a chamber for holding the hydrogen fuel and (ii) a fuel extraction line fluidly coupled to the chamber. The fuel extraction line extends from the aft fuel tank in the forward direction and at a downward angle relative to the centerline of the fuselage.

The aircraft of any preceding clause, wherein each of the forward fuel tank and the aft fuel tank include (i) a center of gravity when filled to capacity with hydrogen fuel in a liquid phase and (ii) a moment arm from the wing center of lift to the center of gravity of each of the forward fuel tank and the aft fuel tank. The forward fuel tank and the aft fuel tank are located within the fuselage such that the moment arm of the forward fuel tank balances the moment arm of the aft fuel tank.

The aircraft of any preceding clause, wherein the chamber of the fuel tank includes a lower portion and an upper portion. The fuel extraction line is fluidly coupled to the lower portion of the chamber.

The aircraft of any preceding clause, wherein the fuel tank further includes a gaseous hydrogen extraction line fluidly coupled to the upper portion of the chamber.

The aircraft of any preceding clause, wherein the fuel tank includes an outer vessel and an inner vessel within the outer vessel. The chamber is located within the inner vessel.

The aircraft of any preceding clause, wherein the fuel tank further includes a gap between the outer vessel and the inner vessel. The gap being under a vacuum to provide thermal isolation for the inner vessel.

The aircraft of any preceding clause, wherein the fuel tank further includes multi-layer insulation in the gap.

The aircraft of any preceding clause, wherein the outer vessel has an outer vessel wall, the outer vessel wall having an inner layer and an outer layer.

The aircraft of any preceding clause, wherein the inner layer is a metal and the outer layer is a composite material.

The aircraft of any preceding clause, wherein the inner vessel has an inner vessel wall, the inner vessel wall having an inner layer and an outer layer.

The aircraft of any preceding clause, wherein the inner layer is a metal and the outer layer is a composite material.

The aircraft of any preceding clause, wherein the fuel extraction line includes a metallic portion, the metallic portion of the fuel extraction line being welded to the inner layer of the inner vessel.

The aircraft of any preceding clause, wherein the fuel tank further includes a suspension to position the inner vessel within the outer vessel with a gap between the outer vessel and the inner vessel to provide thermal isolation for the inner vessel.

The aircraft of any preceding clause, wherein each of the inner vessel and the outer vessel has threads and the suspension includes a hollow tube having threads engaged with the threads of each of the inner vessel and the outer vessel.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. An aircraft comprising:
   a fuselage having a centerline, a forward direction, and an aft direction;
   a power generator configured to provide power to the aircraft;
   a fuel tank for holding fuel for the power generator, the fuel tank being positioned in the fuselage and configured to hold hydrogen fuel in a liquid phase, the fuel tank having (i) a chamber for holding the hydrogen fuel and (ii) a fuel extraction line fluidly coupled to the chamber, at least a portion of the fuel extraction line directly attached to the fuel tank, the portion of the fuel extraction line directly attached to the fuel tank extending from the fuel tank at a downward angle relative to the centerline of the fuselage, the downward angle being greater than twenty degrees;
   a liquid hydrogen pump fluidly connected to the fuel extraction line, the fuel extraction line extending from the fuel tank to the liquid hydrogen pump; and
   a fuel delivery assembly fluidly coupled to the liquid hydrogen pump downstream of the liquid hydrogen pump to receive liquid hydrogen from the fuel tank, the fuel delivery assembly fluidly connecting the fuel tank to the power generator and configured to provide the hydrogen fuel from the fuel tank to the power generator.

2. The aircraft of claim 1, wherein the fuel tank includes an outer vessel and an inner vessel within the outer vessel, the chamber being located within the inner vessel.

3. The aircraft of claim 2, wherein the fuel tank further includes a gap between the outer vessel and the inner vessel, the gap being under a vacuum to provide thermal isolation for the inner vessel.

4. The aircraft of claim 3, wherein the fuel tank further includes multi-layer insulation in the gap.

5. The aircraft of claim 2, wherein the outer vessel has an outer vessel wall, the outer vessel wall having an inner layer and an outer layer.

6. The aircraft of claim 5, wherein the inner layer is a metal and the outer layer is a composite material.

7. The aircraft of claim 2, wherein the inner vessel has an inner vessel wall, the inner vessel wall having an inner layer and an outer layer.

8. The aircraft of claim 7, wherein the inner layer is a metal and the outer layer is a composite material.

9. The aircraft of claim 2, wherein:
each of the inner vessel and the outer vessel has threads, and
the fuel tank further includes a suspension to position the inner vessel within the outer vessel with a gap between the outer vessel and the inner vessel to provide thermal isolation for the inner vessel, the suspension including a hollow tube having threads engaged with the threads of each of the inner vessel and the outer vessel.

10. The aircraft of claim 1, wherein:
the fuel tank is a forward fuel tank;
the aircraft further comprises a pair of wings connected to the fuselage and configured to generate a wing center of lift, the forward fuel tank being located forward of the wing center of lift; and
the aircraft further comprises an aft fuel tank configured to hold hydrogen fuel in a liquid phase, the aft fuel tank having (i) a chamber for holding the hydrogen fuel and (ii) a fuel extraction line fluidly coupled to the chamber, the fuel extraction line extending from the aft fuel tank in the forward direction and at a downward angle relative to the centerline of the fuselage.

11. The aircraft of claim 10, wherein each of the forward fuel tank and the aft fuel tank include (i) a center of gravity when filled to capacity with hydrogen fuel in a liquid phase and (ii) a moment arm from the wing center of lift to the center of gravity of each of the forward fuel tank and the aft fuel tank, the forward fuel tank and the aft fuel tank being located within the fuselage such that the moment arm of the forward fuel tank balances the moment arm of the aft fuel tank.

12. The aircraft of claim 1, wherein the chamber of the fuel tank includes a lower portion and an upper portion, the fuel extraction line being fluidly coupled to the lower portion of the chamber.

13. The aircraft of claim 12, wherein the fuel tank further includes a gaseous hydrogen extraction line fluidly coupled to the upper portion of the chamber.

14. The aircraft of claim 1, wherein the fuel tank includes at least one baffle in the chamber.

15. The aircraft of claim 1, wherein the fuel extraction line is a vacuum jacketed pipe.

16. The aircraft of claim 1, wherein the fuel tank further includes a hydrogen vapor return line fluidly connecting the liquid hydrogen pump to the chamber to return gaseous hydrogen from the liquid hydrogen pump to the chamber, the hydrogen vapor return line extending from the fuel tank in the forward direction and at a downward angle relative to the centerline of the fuselage.

17. The aircraft of claim 1, wherein:
the fuselage includes a maximum internal diameter;
the fuel tank is cylindrical having an outer diameter; and
a ratio of the outer diameter of the fuel tank to the maximum internal diameter of the fuselage is from eight-tenths to nine-tenths.

18. The aircraft of claim 1, wherein the power generator is a gas turbine engine.

19. The aircraft of claim 1, further comprising a pair of wings connected to the fuselage and configured to generate a wing center of lift, the fuel tank being located within the fuselage such that, relative to the forward direction and the aft direction, the fuel tank is located at the wing center of lift.

20. The aircraft of claim 1, wherein the fuel tank includes a metallic portion and the fuel extraction line includes a metallic portion, the metallic portion of the fuel extraction line being welded to the metallic portion of the fuel tank.

\* \* \* \* \*